United States Patent
Ootaki et al.

(10) Patent No.: US 8,527,682 B2
(45) Date of Patent: Sep. 3, 2013

(54) BUS CONTROLLER, BUS COMMUNICATION SYSTEM, AND BUS CONTROL METHOD

(75) Inventors: Hiroshi Ootaki, Tokyo (JP); Yasuhito Oomiya, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 117 days.

(21) Appl. No.: 13/056,529

(22) PCT Filed: Aug. 22, 2008

(86) PCT No.: PCT/JP2008/064982
§ 371 (c)(1),
(2), (4) Date: Jan. 28, 2011

(87) PCT Pub. No.: WO2010/021054
PCT Pub. Date: Feb. 25, 2010

(65) Prior Publication Data
US 2011/0179206 A1    Jul. 21, 2011

(51) Int. Cl.
*G06F 13/00* (2006.01)
(52) U.S. Cl.
USPC ............ 710/107; 710/240; 710/260; 710/200
(58) Field of Classification Search
USPC .................. 710/107, 240–244, 260–269, 200
See application file for complete search history.

(56) References Cited

U.S. PATENT DOCUMENTS

| | | | |
|---|---|---|---|
| 5,544,332 A * | 8/1996 | Chen | ............................ 710/108 |
| 5,666,559 A | 9/1997 | Wisor et al. | |
| 5,787,263 A | 7/1998 | Tamagawa et al. | |
| 5,797,020 A | 8/1998 | Bonella et al. | |
| 7,062,582 B1 | 6/2006 | Chowdhuri | |
| 2003/0133470 A1 | 7/2003 | Tanaka | |
| 2003/0191880 A1 | 10/2003 | Lin | |
| 2004/0010644 A1 | 1/2004 | Drerup et al. | |

(Continued)

FOREIGN PATENT DOCUMENTS

| | | |
|---|---|---|
| EP | 0 537 899 A1 | 4/1993 |
| EP | 0 848 332 A1 | 6/1998 |

(Continued)

OTHER PUBLICATIONS

Japanese Office Action issued Feb. 14, 2012 in patent application No. 2010-525539 with English translation.

(Continued)

*Primary Examiner* — Tim T Vo
*Assistant Examiner* — Kim Huynh
(74) *Attorney, Agent, or Firm* — Oblon, Spivak, McClelland, Maier & Neustadt, L.L.P.

(57) ABSTRACT

It is an object to prevent a command-issuing interval from being fixed and then avoid a situation where a target always returns a retry by varying a timing of a command-issuing request (i.e., a request signal) from each initiator, even if a plurality of initiators simultaneously or alternately make a plurality of command-issuing requests (i.e., send request signals). Based on predetermined priorities, a bus control unit sends a grant signal to an initiator that has sent a request signal, thereby granting use of a bus to the initiator. A mask generating unit sends a mask signal to at least one initiator to have the initiator mask a request signal, thereby controlling a timing, at which the bus control unit grants use of the bus to the initiator, to be aperiodic.

9 Claims, 11 Drawing Sheets

(56) References Cited

U.S. PATENT DOCUMENTS

| | | | |
|---|---|---|---|
| 2004/0143691 A1 * | 7/2004 | Brown et al. | ................ 710/110 |
| 2006/0248250 A1 | 11/2006 | Sarkar et al. | |
| 2007/0022238 A1 | 1/2007 | Metsker | |

FOREIGN PATENT DOCUMENTS

| | | | | |
|---|---|---|---|---|
| EP | 1 096 387 A1 | | 5/2001 | |
| JP | 5 53979 | | 3/1993 | |
| JP | 5-053979 | * | 3/1993 | |
| JP | 6-236329 | * | 8/1994 | |
| JP | 06 337843 | | 12/1994 | |
| JP | 07 311716 | | 11/1995 | |
| JP | 11-184805 | * | 7/1999 | |
| JP | 11 184805 | | 7/1999 | |
| JP | 11-345198 | * | 12/1999 | |
| JP | 2003 218871 | | 7/2003 | |
| JP | 2003 281083 | | 10/2003 | |
| JP | 2004-220597 | * | 8/2004 | |
| TW | I258081 B | | 7/2006 | |

OTHER PUBLICATIONS

Taiwanese Office Action issued Jun. 22, 2012 in Patent Application No. 97135745 with English Translation.

Extended European Search Report issued Apr. 22, 2013 in Patent Application No. 08809204.4.

Office Action issued Mar. 29, 2013 in Chinese Patent Application No. 200880130776.8 (with English translation).

Office Action issued Apr. 18, 2013 in Taiwanese Patent Application No. 097135745 (with English translation).

* cited by examiner

Fig. 2

| INITIATOR MASK ID | MASK CONDITION (O: SUBJECT TO MASKING) INITIATOR | | | | | DESCRIPTION |
|---|---|---|---|---|---|---|
| | A | B | C | D | E | |
| 0 |   | O | O | O | O | ONLY A IS GRANTED |
| 1 | O |   | O | O | O | ONLY B IS GRANTED |
| 2 | O | O |   | O | O | ONLY C IS GRANTED |
| 3 | O | O | O |   | O | ONLY D IS GRANTED |
| 4 | O | O | O | O |   | ONLY E IS GRANTED |
| 5 | O | O | O | O | O | NONE IS GRANTED |
| 6 | O | O |   |   |   | ONLY C, D, AND E ARE GRANTED |
| 7 |   | O | O |   |   | ONLY A, D, AND E ARE GRANTED |
| 8 |   |   | O | O |   | ONLY A, B, AND E ARE GRANTED |
| 9 |   |   |   | O | O | ONLY A, B, AND C ARE GRANTED |

Fig. 7

| COMMAND TYPE | INITIATOR MASK ID | MASK CONDITION (O: SUBJECT TO MASKING) INITIATOR | | | | | DESCRIPTION |
|---|---|---|---|---|---|---|---|
| | | A | B | C | D | E | |
| READ | 0 | | O | O | O | O | ONLY READ BY A IS GRANTED |
| | 1 | O | | O | O | O | ONLY READ BY B IS GRANTED |
| | 2 | O | O | | O | O | ONLY READ BY C IS GRANTED |
| | 3 | O | O | O | | O | ONLY READ BY D IS GRANTED |
| | 4 | O | O | O | O | | ONLY READ BY E IS GRANTED |
| | 5 | O | O | O | O | O | READ BY NONE IS GRANTED |
| | 6 | | | O | O | O | ONLY READS BY C, D, AND E ARE GRANTED |
| | 7 | | O | | O | O | ONLY READS BY A, D, AND E ARE GRANTED |
| | 8 | | | O | O | O | ONLY READS BY A, B, AND E ARE GRANTED |
| | 9 | | | | O | O | ONLY READS BY A, B, AND C ARE GRANTED |
| WRITE | 10 | | O | O | O | O | ONLY WRITE BY A IS GRANTED |
| | 11 | O | | O | O | O | ONLY WRITE BY B IS GRANTED |
| | 12 | O | O | | O | O | ONLY WRITE BY C IS GRANTED |
| | 13 | O | O | O | | O | ONLY WRITE BY D IS GRANTED |
| | 14 | O | O | O | O | | ONLY WRITE BY E IS GRANTED |
| | 15 | O | O | O | O | O | WRITE BY NONE IS GRANTED |
| | 16 | O | O | | | | ONLY WRITES BY C, D, AND E ARE GRANTED |
| | 17 | | O | | | O | ONLY WRITES BY A, D, AND E ARE GRANTED |
| | 18 | | | | O | | ONLY WRITES BY A, B, AND E ARE GRANTED |
| | 19 | | | | O | O | ONLY WRITES BY A, B, AND C ARE GRANTED |

…

BUS CONTROLLER, BUS COMMUNICATION SYSTEM, AND BUS CONTROL METHOD

TECHNICAL FIELD

The present invention relates to a bus controller, a bus communication system, and a bus control method. The present invention relates particularly to a data bus communication method.

BACKGROUND ART

In recent years, as a bus communication system has become more sophisticated and devices connected to a bus communication system have increased in number and improved in performance, a system bus is being placed under increasing load. Under such circumstances, requests issued beyond the capacity of a system bus or a memory bus have led to cases where only high-priority initiators are serviced, causing low-priority initiators to hang. Therefore, to give low-priority initiators a chance to be serviced, methods such as round-robin and LRU (Least Recently Used) have been adopted to provide equal service to each initiator. However, even in a system where round-robin or LRU is adopted, there is a problem. The problem is that, if there occurs a case where each initiator simultaneously or alternately issues a plurality of requests, and each initiator is given the bus access alternately and issues a command equally, some initiators may always be denied access and obliged to perform retries because the target they wish to access is always busy processing a command from another initiator, and the initiators may never get a chance to have their commands accepted and thus hang.

Patent Literature 1 discloses a system wherein high-priority initiators, for each of which an access interval is fixed, and low-priority initiators, for each of which an access interval is not prescribed, access the same target. In the system, a threshold is set to the bus release period for the low-priority initiators, and thereby release of the bus in use is interrupted and the bus access is assigned to the high-priority initiators so that high-priority accesses are guaranteed.

Patent Literature 1: JP2003-281083A

DISCLOSURE OF INVENTION

Technical Problem

Patent Literature 1 does not disclose a method for avoiding such a situation that, when there occurs a case where each initiator simultaneously or alternately issues a plurality of requests, and each initiator is given the bus access alternately and issues a command equally, some initiators may always be obliged to perform retries because the target they wish to access is always busy processing a command from another initiator, and the initiators may not get a chance to have their commands accepted.

FIG. 11 shows a commonly used data bus system. The system shown in FIG. 11 is composed of a plurality of initiators, at least one target configured to process a command from each initiator, a bus controller configured to provide services in response to requests from the plurality of initiators equally or based on fixed priorities according to a priority control method such as round-robin or LRU, and a bus configured to select and drive one command. The bus controller, which controls the priorities, receives a command-issuing request (i.e., a request signal ("request")) before each initiator sends an address and a command on the bus. When granting the request, the bus controller returns a "grant" (i.e., a grant signal) to an initiator. The initiator having received the "grant" issues an address and a command ("cmd") to the target. The target, which processes a command from each initiator, checks the address and the command, and returns an "accept" or a "retry" to the initiator. However, the system configured in this way has a problem. The problem is that, when the service capability of the target is not sufficient for command-issuing from the plurality of initiators, only retries are returned to some initiators whenever they issue commands, and if, until the initiators are accepted, operations of other initiators do not change then the entire bus will hang up.

Although the method disclosed in Patent Literature 1 ensures that high-priority initiators are assigned the bus access, the method cannot avoid a case where the target returns a retry to every command issued by each initiator after the bus access is assigned. A case where, while a plurality of initiators simultaneously or alternately request to issue a plurality of commands, the target returns a retry to every command issued by the same initiator, and then the initiator hangs must always be avoided, even though the case occurs less frequently.

The present invention aims, for example, to prevent a command-issuing interval from being fixed and then avoid a situation where the target always returns a retry by varying the timing of a command-issuing request (i.e., a request signal) from each initiator, even if a plurality of initiators simultaneously or alternately make a plurality of command-issuing requests (i.e., send request signals).

Solution to Problem

A bus controller according to one aspect of the present invention is a bus controller for controlling a bus communication system wherein each initiator of a plurality of initiators connected to a bus sends, upon being granted use of the bus, a command signal to instruct execution of a predetermined process to a target connected to the bus, and, when the each initiator determines that the predetermined process is not to be executed by the target, the each initiator sends, upon being granted use of the bus again, the command signal to the target, the bus controller including:

a bus control unit configured to grant use of the bus to the each initiator based on predetermined priorities; and a mask generating unit configured to control a timing, at which the bus control unit grants use of the bus to at least one initiator, to be aperiodic.

The each initiator generates and sends a request signal to request use of the bus to the bus control unit at predetermined intervals, and the mask generating unit masks the request signal generated by the each initiator to control a timing, at which the request signal is sent from the each initiator, to be aperiodic.

The mask generating unit includes a mask interval setting unit configured to set, as a mask interval, an interval for masking the request signal generated by the each initiator.

The mask generating unit further includes a mask condition setting unit configured to set, as a mask condition, an initiator subject to masking for each mask interval set by the mask interval setting unit.

The mask generating unit further includes an initiator mask ID (identifier) counter configured to change the mask condition set by the mask condition setting unit for each mask interval set by the mask interval setting unit.

The mask condition setting unit sets, as the mask condition, an initiator subject to masking according to a type of the command signal.

The mask generating unit further includes a mask period setting unit configured to set, as a mask period, a period of time to perform masking during each mask interval set by the mask interval setting unit.

The mask generating unit further includes a subject-of-masking indication flag setting unit configured to set whether or not the each initiator is subject to masking.

A bus communication system according to one aspect of the present invention is a bus communication system including a plurality of initiators and at least one target both connected to a bus, wherein each initiator sends, upon being granted use of the bus, a command signal to instruct execution of a predetermined process to a target, and, when the each initiator determines that the predetermined process is not to be executed by the target, the each initiator sends, upon being granted use of the bus again, the command signal to the target, the bus communication system further including a bus controller connected to the bus, the bus controller including a bus control unit configured to grant use of the bus to the each initiator based on predetermined priorities, and a mask generating unit configured to control a timing, at which the bus control unit grants use of the bus to at least one initiator, to be aperiodic.

A bus control method according to one aspect of the present invention is a bus control method for controlling a bus communication system wherein each initiator of a plurality of initiators connected to a bus sends, upon being granted use of the bus, a command signal to instruct execution of a predetermined process to a target connected to the bus, and, when the each initiator determines that the predetermined process is not to be executed by the target, the each initiator sends, upon being granted use of the bus again, the command signal to the target, the bus control method including:

granting use of the bus to the each initiator based on predetermined priorities; and controlling a timing, at which the granting grants use of the bus to at least one initiator, to be aperiodic.

Advantageous Effects of Invention

According to one aspect of the present invention, in a bus controller, a mask generating unit controls a timing at which a bus control unit grants use of a bus to at least one initiator so that the timing becomes aperiodic. In this way, it is possible to prevent a command-issuing interval from being fixed and then avoid a situation where a target always returns a retry.

DESCRIPTION OF PREFERRED EMBODIMENTS

Embodiments of the present invention will now be described with reference to drawings.

Embodiment 1

In this embodiment, a data bus communication system will be described with reference to the drawings. In the data bus communication system, in order to vary the timings or intervals to grant issuing commands (in order to vary bus access intervals), initiators other than the one a request from which should be accepted are masked for a given period of time, thereby providing irregularity.

FIG. 1 is a block diagram showing a configuration of a bus communication system 100 wherein initiators 102 other than the one a request from which should be accepted can be masked for a given period of time.

In FIG. 1, the bus communication system 100 includes a bus controller 101, a plurality of initiators 102, and at least one target 103. The bus controller 101, the initiators 102, and the target 103 are connected to a bus 104.

The bus controller 101 is configured by adding a mask generating unit 110 that generates a mask signal to a bus controller shown in FIG. 11, and controls the bus communication system 100. Each initiator 102 makes a command-issuing request (i.e., sends a request signal) to the bus controller 101, and issues a command to the target 103. The target 103 processes a command from each initiator 102. The bus 104 selects and drives a command from one initiator 102.

Specifically, an initiator 102 generates a request signal ("request") for requesting use of the bus 104 to issue a command and sends the request signal to the bus controller 101 in a predetermined interval. Upon receiving the request signal ("request") from the initiator 102, the bus controller 101 determines whether or not to grant the initiator 102 permission to issue a command, that is, whether or not to grant use of the bus 104. If the bus controller 101 determines to grant use of the bus 104 to the initiator 102, the bus controller 101 sends a grant signal ("grant") to the initiator 102. Upon receiving the grant signal ("grant") from the bus controller, that is, upon being granted use of the bus 104 in a given interval, the initiator 102 sends to the target 103 a command signal ("cmd") to instruct execution of a predetermined process. Upon receiving the command signal ("cmd") from the initiator 102, the target 103 determines whether or not to process the command from the initiator 102, that is, whether or not to be able to execute the instructed process. If the target 103 determines that it can execute the process instructed by the initiator 102, the target 103 sends an accept signal ("accept") to the initiator 102. On the other hand, if the target 103 determines that it cannot execute the process instructed by the initiator 102, the target 103 sends a retry signal (retry) to the initiator 102. Note that the bus controller 101 may determine whether or not to have the target 103 execute the process instructed by the initiator 102, and, if the bus controller 101 determines not to have the target 103 execute the process, the bus controller 101 may send a retry signal ("retry") to the initiator 102. If the initiator 102 receives the retry signal ("retry"), that is, if the initiator 102 determines (recognizes) that the process is not to be executed by the target 103, the initiator 102 sends a command signal ("cmd") to the target 103 when the initiator 102 receives a grant signal ("grant") from the bus controller 101, that is, when the initiator 102 is granted use of the bus 104 again in subsequent intervals. Thereafter, communication is repeated in a similar manner.

The bus controller 101 includes the mask generating unit 110 and a bus control unit 120.

The mask generating unit 110 generates a signal (mask signal) to mask, for a given period of time, the initiators 102 other than the one a request from which should be accepted in a given access interval, in order to vary gaps between access intervals or to vary access intervals. The bus control unit 120 controls the priorities of requests from each initiator 102. That is, based on predetermined priorities, the bus control unit 120 sends a grant signal ("grant") to an initiator 102 that has sent a request signal ("request"), thereby granting use of the bus 104 to the initiator 102. The mask generating unit 110 sends a mask signal to at least one initiator 102 to have the initiator 102 mask a request signal ("request") (e.g., to prevent the initiator 102 from sending a request signal, or to have the initiator 102 send a meaningless signal as a request signal), thereby controlling the timing, at which the bus control unit 120 grants use of the bus 104 to the initiator 102, to be aperiodic. That is, the mask generating unit 110 masks a request signal ("request") generated by each initiator 102 to control the timing, at which the request signal ("request") is sent from each initiator 102, to be aperiodic. Note that the mask generating unit 110 may send a mask signal to the bus control unit 120 to have the bus control unit 120 mask a request signal ("request") from at least one initiator 102 (e.g., to have the bus control unit 120 ignore a received request signal, or to have the bus control unit 120 convert a received request signal into a meaningless signal), thereby controlling the timing, at which the bus control unit 120 grants use of the bus 104 to the initiator 102, to be aperiodic. That is, the mask generating unit 110 may mask a request signal ("request") received from each initiator 102 at the bus control unit 120 to control the timing, at which the request signal ("request") is processed (or detected) inside the bus control unit 120, to be aperiodic. Alternatively, the mask generating unit 110 may send a mask signal to the bus control unit 120 to have the bus control unit 120 mask a grant signal ("grant") to at least one initiator 102 (e.g., to prevent the bus control unit 120 from sending a grant signal, or to have the bus control unit 120 send a meaningless signal as a grant signal), thereby controlling the timing, at which the bus control unit 120 grants use of the bus 104 to the initiator 102, to be aperiodic. That is, the mask generating unit 110 may mask a grant signal ("grant") generated by the bus control unit 120 to control the timing, at which the grant signal ("grant") is sent from the bus control unit 120, to be aperiodic.

The mask generating unit 110 includes a mask interval setting unit 111, an initiator mask ID (identifier) counter 112, a mask period setting unit 113, a mask condition setting unit 114, and a subject-of-masking indication flag setting unit 115.

The mask interval setting unit 111 arbitrarily sets the timing (interval) for masking. Specifically, the mask interval setting unit 111 sets, as a mask interval, an interval for masking a request signal ("request") generated by each initiator 102. The initiator mask ID counter 112 arbitrarily sets the initiator 102 subject to masking, which is changed for each mask interval. Specifically, the initiator mask ID counter 112 changes the mask condition set by the mask condition setting unit 114 to be described later, for each mask interval set by the mask interval setting unit 111. The mask period setting unit 113 arbitrarily sets a mask period for the initiator 102 subject to masking. That is, the mask period setting unit 113 sets, as the mask period, a period of time to perform masking during each mask interval set by the mask interval setting unit. The mask condition setting unit 114 sets, as the mask condition, the initiator 102 subject to masking for each mask interval set by the mask interval setting unit 111. Then, the mask condition setting unit 114 outputs a mask signal for a period set by the mask period setting unit 113, to the initiator 102 corresponding to the initiator mask ID counter 112. The subject-of-masking indication flag setting unit 115 arbitrarily sets whether to enable or disable masking for each initiator 102. That is, the subject-of-masking indication flag setting unit 115 sets whether or not each initiator 102 is subject to masking.

Referring now to FIG. 2, there is shown an example of mask condition settings. FIG. 2 shows an example where there are five initiators 102 and, as the mask conditions, initiator mask IDs 0 to 9 are provided to create cases where each one of the initiators 102 is guaranteed to be granted at least once, a case where none of the initiators 102 is granted, and cases where the initiators 102 are granted in groups of three. FIG. 2 thus shows the correspondence between the initiator mask IDs and the initiators 102 subject to masking. The mask conditions may be set arbitrarily and is preferably set as appropriate according to the configuration of the bus communication system 100. It is nevertheless considered that various configurations can be supported by setting mask conditions corresponding to the initiator mask IDs 0 to 5 of this example. Especially, it is considered that the bus communication system 100 having great versatility can be provided by setting mask conditions corresponding to the initiator mask IDs 0 to 4.

The bus communication system 100 is implemented, for example, on a computer. The bus controller 101 of the bus communication system 100 is controlled by a CPU 201 (Central Processing Unit) included in the computer. Using a memory 202 such as a ROM (Read Only Memory) or a RAM (Random Access Memory) included in the computer, the CPU 201 executes a program, for example, to configure the settings of the mask interval setting unit 111, the mask period setting unit 113, and the subject-of-masking indication flag setting unit 115 of the mask generating unit 110. As will be described later, when the mask condition setting unit 114 is implemented as circuitry, by making it possible to arbitrarily configure the settings of the mask interval setting unit 111, the mask period setting unit 113, and the subject-of-masking indication flag setting unit 115 by the program, it becomes easy to perform masking appropriate to the configuration of the bus communication system 100.

In the explanation of this embodiment, that which is described as a "... unit" may be a "... circuit", a "... device", or "... equipment", or may also be a "... step", a "... procedure", or a "... process". That which is described as a "unit" may be implemented by firmware stored in the memory 202. Alternatively, it may be implemented entirely by software, or entirely by hardware such as elements, devices, boards, wirings, or a combination of software and hardware, or a combination further including firmware. Firmware and software are stored as programs in the memory 202. The programs are read by the CPU 201 and executed by the CPU 201. In other words, the programs cause the computer to function as each "... unit" described in the explanation of this embodiment. Alternatively, the programs cause the computer to execute a procedure or method of each "unit" described in the explanation of this embodiment.

Next, with reference to FIGS. 3, 4, and 5, an explanation will be provided of operations performed when the mask interval is Ta, the initiator mask ID is 2, the mask period is Tm, and the subject-of-masking indication flags are enabled for initiators A and C under the settings of the mask conditions shown as an example in FIG. 2.

FIG. 3 is an operating principle diagram of the mask generating unit 110. In FIG. 3, the initiator mask ID is 2 and the subject-of-masking indication flags are enabled for the initiators A and C. Thus, the mask generating unit 110 outputs a mask signal only to the initiator A.

FIG. 4 is a diagram showing the relationship of the mask interval, the mask period, and the initiator mask ID counter 112. In FIG. 4, the initiator mask ID is 2. Therefore, the initiators 102 corresponding to this are all the initiators 102 except the initiator C according to the mask condition shown in FIG. 2. On the other hand, the subject-of-masking indication flags are enabled only for the initiators A and C. Thus, when the initiator mask ID is 2, only the initiator A is subject to masking.

FIG. 5 is a timing chart for the initiators A and C which are indicated by the subject-of-masking indication flags. In FIG. 5, (1) prior to masking (when masking is not performed), the initiator C repeatedly receives a retry response from the target. (2) After masking (when masking is performed) and when the mask period Tm is longer than the request interval TreqA of the initiator A, the initiator A is masked for the mask period Tm. Thus, the initiator C which has repeatedly received a retry response is accepted. (3) After masking (when masking is performed) and when the mask period Tm is shorter than the request interval TreqA of the initiator A, the initiator A is also masked for the mask period Tm if the mask period Tm overlaps the beginning of the request interval TreqA of the initiator A. Thus, the initiator C which has repeatedly received a retry response is accepted. Note that the timing charts of (2) and (3) may be illustration of signal values measured on the bus 104 or illustration of signal values measured inside the bus controller 101. When the mask generating unit 110 masks a request signal ("request") generated by each initiator 102 to control the timing, at which the request signal ("request") is sent from each initiator 102, to be aperiodic, both of signal values measured on the bus 104 and signal values measured inside the bus controller 101 will be as illustrated in (2) and (3). On the other hand, when the mask generating unit 110 masks a request signal ("request") received at the bus control unit 120 from each initiator 102 to control the timing, at which the request signal ("request") is processed (or detected) inside the bus control unit 120, to be aperiodic, signal values measured on the bus 104 will be as illustrated in (1), but signal values measured inside the bus controller 101 will be as illustrated in (2) and (3).

An explanation will hereinafter be provided of operations in which the mask generating unit 110 additionally included in the bus controller 101 generates and outputs a mask signal for varying the issuing timing of a request from each initiator 102.

FIG. 6 is a flowchart showing a series of operations in which the mask generating unit 110 of the bus controller 101 outputs a mask signal.

In step S101, the mask generating unit 110 resets the mask interval counter for detecting the mask interval and the initiator mask ID counter 112 configured to change the initiator 102 subject to masking for each mask interval, and then proceeds to step S102. In step S102, the mask generating unit 110 starts counting of the mask interval counter, and then proceeds to step S103. In step S103, if the mask interval counter coincides with the mask interval, the mask generating unit 110 proceeds to step S104. If the mask interval counter does not coincide with the mask interval, the mask generating unit 110 increments the mask interval counter. In step S104, the mask generating unit 110 increments the initiator mask ID counter 112 by one, outputs a selection signal for the initiator 102 corresponding to the initiator mask ID, clears the mask interval counter, restarts counting, and then proceeds to step S105. In step S105, the mask generating unit 110 starts masking of the initiator 102 the subject-of-masking indication flag for which is enabled, and which is selected as the subject of masking corresponding to the initiator mask ID, starts counting by the mask period counter, and then proceeds to step S106. In step S106, if the mask period counter has counted to the mask period, the mask generating unit 110 stops the masking. If the mask period counter has not counted to the mask period, the mask generating unit 110 increments the mask period counter by one. Then, the mask generating unit 110 proceeds to step S107. In step S107, the mask generating unit 110 stops the masking, and then proceeds to step S103 again.

As presented above, according to this embodiment, the mask generating unit 110 is added to the bus controller 101. The mask generating unit 110 masks for a given period of time the initiator 102 subject to masking, which is changed at given intervals. In this way, the timing of a command-issuing request (i.e., a request signal ("request")) from each initiator 102 is varied, even if a plurality of initiators 102 simultaneously or alternately make a plurality of command-issuing requests (i.e., send request signals ("request")). Therefore, it is possible to prevent a command ("cmd") issuing interval from being fixed and then avoid a situation where a retry response ("retry") is always made from the target 103.

As has been described, in this embodiment, the bus communication system 100 includes the plurality of initiators 102, at least one target 103 configured to process a command from each initiator 102, and the bus controller 101 configured to control the priorities of requests from the plurality of initiators 102. The bus communication system 100 is characterized in that the bus controller 101 includes the mask generating unit 110 configured to vary the timing at which a request is issued from each initiator 102. The mask generating unit 110 masks a command-issuing request (i.e., a request signal ("request")) from each initiator 102, thereby varying the timing of a command-issuing request (i.e., a request signal ("request")) from each initiator 102. In this way, a deadlock or the like caused by a "retry" from the target can be avoided.

The bus controller 101 is characterized in that the mask generating unit 110 includes the mask interval setting unit 111 configured to be able to arbitrarily set the timing for masking. This makes it possible to arbitrarily set the mask interval depending on the system.

The bus controller 101 is characterized in that the mask generating unit 110 includes the mask condition setting unit 114 configured to determine the initiator 102 subject to masking for each mask interval. This makes it possible to arbitrarily set the initiator 102 subject to masking for each access interval depending on the system.

The bus controller 101 is characterized in that the mask generating unit 110 includes the mask period setting unit 113 configured to arbitrarily determine the mask period for each mask interval. This makes it possible to arbitrarily set the mask period for the initiator 102 subject to masking depending on the system.

The bus controller 101 is characterized in that the mask generating unit 110 includes the subject-of-masking indication flag setting unit 115 configured to determine whether to enable or disable masking control. This makes it possible to arbitrarily set whether to enable or disable the masking for each initiator 102 depending on the system.

The bus controller 101 is characterized in that the mask generating unit 110 includes the initiator mask ID counter 112 configured to change the mask condition in the mask condition setting unit 114 for each mask interval. This makes it possible to arbitrarily set the initiator 102 subject to masking, which is changed for each mask interval.

In this way, according to this embodiment, the request-issuing timing is varied, thereby giving each initiator 102 a chance to have a command request accepted. This holds true even in a situation that, when there occurs a case where each initiator 102 simultaneously or alternately issues a plurality of requests, and each initiator 102 is given the bus access alternately and issues a command equally, some initiators 102 may always be obliged to perform retries because the target they wish to access is always busy processing a command from another initiator 102, and the initiators 102 may not get a chance to have their commands accepted.

Embodiment 2

This embodiment, mainly differences from the first embodiment, will be described.

In the first embodiment, the mask condition setting unit 114 simply sets a combination of the initiators 102 subject to masking as the mask condition. In this embodiment, the mask condition setting unit 114 sets the initiator 102 subject to masking as the mask condition, according to the type of a command signal ("cmd"). Specifically, the mask condition setting unit 114 sets a combination of the initiators 102 subject to masking as the mask condition, separately for when a command signal ("cmd") instructs execution of a process involving a read operation in a data bus and when a command signal ("cmd") instructs execution of a process involving a write operation in the data bus. As the types of a command signal ("cmd"), classifications other than read and write may be used. For example, the mask condition setting unit 114 may set a combination of the initiators 102 subject to masking as the mask condition, separately for when a command signal ("cmd") instructs execution of a process involving a single transfer operation in the data bus and when a command signal ("cmd") instructs execution of a process involving a burst transfer operation in the data bus.

Referring now to FIG. 7, there is shown an example of mask condition settings. FIG. 7 shows the mask condition settings for masking a read-type command-issuing request (i.e., a request signal ("request")) and a write-type command-issuing request (i.e., a request signal ("request")) separately. The initiator mask IDs 0 to 9 indicate the mask conditions for masking a read-type command-issuing request (i.e., a request signal ("request")), and the initiator mask IDs 10 to 19 indicate the mask conditions for masking a write-type command-issuing request (i.e., a request signal ("request")).

In this embodiment, the configuration and operation of the mask generating unit 110 are the same as the first embodiment, and thus the explanation is omitted.

As presented above, according to this embodiment, a subject of masking is limited to either read or write by each initiator 102 depending on the mask condition (a mask condition in which both read and write are subjects may also be added), thereby making it possible to perform masking control in a detailed manner. In this way, it is possible, while reducing redundant masking, to vary the timing of a command-issuing request (i.e., a request signal ("request")) from each initiator 102, prevent a command ("cmd") issuing interval from being fixed, and then avoid a situation where a retry response ("retry") is always made from the target 103.

As has been described, this embodiment is characterized in that the mask condition setting unit 114 provides as the mask conditions ones that are defined separately for read or write (or both read and write) and switches between these mask conditions for use sequentially. This makes it possible to change subject of masking in a detailed manner, and thus avoid a situation where masking is performed beyond necessity.

Embodiment 3

This embodiment, mainly differences from the first embodiment, will be described.

In the first embodiment, the mask period set by the mask period setting unit 113 is common to all the mask conditions. In this embodiment, the mask period is set individually for each initiator mask ID.

FIG. 8 is an operating principle diagram of the mask generating unit 110, where one of mask periods Tm0 to Tm9 corresponding to the initiator mask IDs is set. In FIG. 8, the initiator mask ID is 2, and thus the mask period Tm2 is set by the mask period setting unit 113.

FIG. 9 is a diagram showing the relationship of the mask interval, the mask period, and the initiator mask ID counter 112 when the mask period is set for each initiator mask ID. In FIG. 9, when the initiator mask ID is 2, the mask period is Tm2. In this way, the mask period changes for each mask interval according to the initiator mask ID.

An explanation will hereinafter be provided of operations in which the mask generating unit 110 additionally included in the bus controller 101 generates and outputs a mask signal for varying the issuing timing of a request from each initiator 102.

FIG. 10 is a flowchart showing a series of operations in which the mask generating unit 110 of the bus controller 101 outputs a mask signal.

Steps S201 to S204 are the same as steps S101 to S104 in FIG. 6, and thus the explanation is omitted. In step S205, the mask generating unit 110 starts masking of the initiator 102 the subject-of-masking indication flag for which is enabled, and which is selected as the subject of masking corresponding to the initiator mask ID, sets the mask period provided for each initiator mask ID in the mask period counter and starts counting, and then proceeds to step S206. Steps S206 and S207 are the same as steps S106 and S107 in FIG. 6, and thus the explanation is omitted.

As presented above, according to this embodiment, the mask period is set for each initiator mask ID, thereby making it possible to perform masking control in a detailed manner. In this way, it is possible, while reducing redundant masking, to vary the timing of a command-issuing request (i.e., a request signal ("request")) from each initiator 102, prevent a command ("cmd") issuing interval from being fixed, and then avoid a situation where a retry response ("retry") is always made from the target 103.

Having thus described the embodiments of the present invention, two or more of these embodiments may be implemented in combination. Alternatively, one of these embodiments may be implemented in part. Alternatively, two or more of these embodiments may be implemented in part and in combination.

BRIEF DESCRIPTION OF DRAWINGS

FIG. 2 is a table showing an example of mask condition settings according to the first embodiment.

FIG. 7 is a table showing an example of mask condition settings according to the second embodiment.

REFERENCE SIGNS LIST

Figure 1:
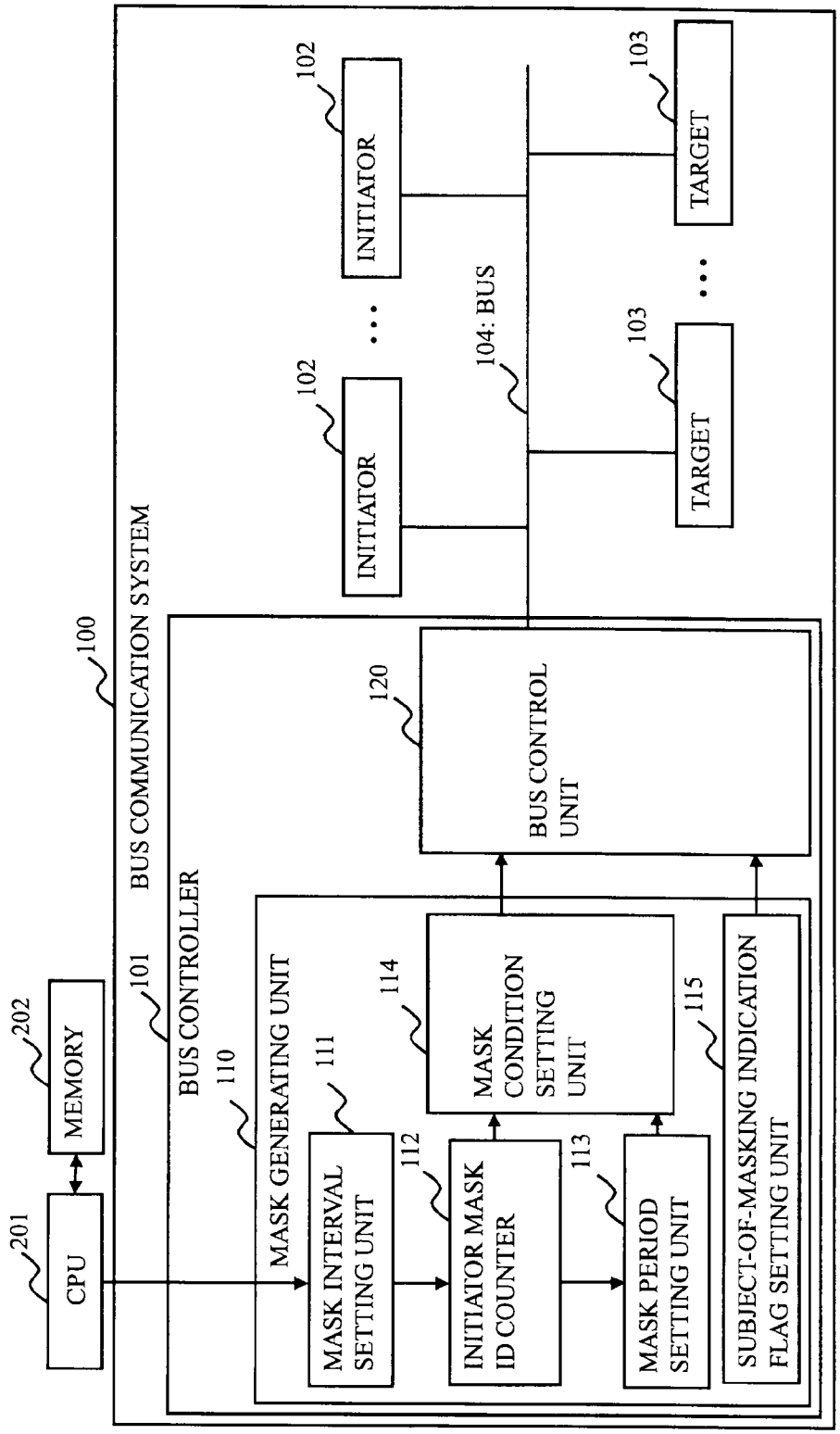
FIG. 1 is a block diagram showing a configuration of a bus communication system according to the first embodiment.
Figure 3:
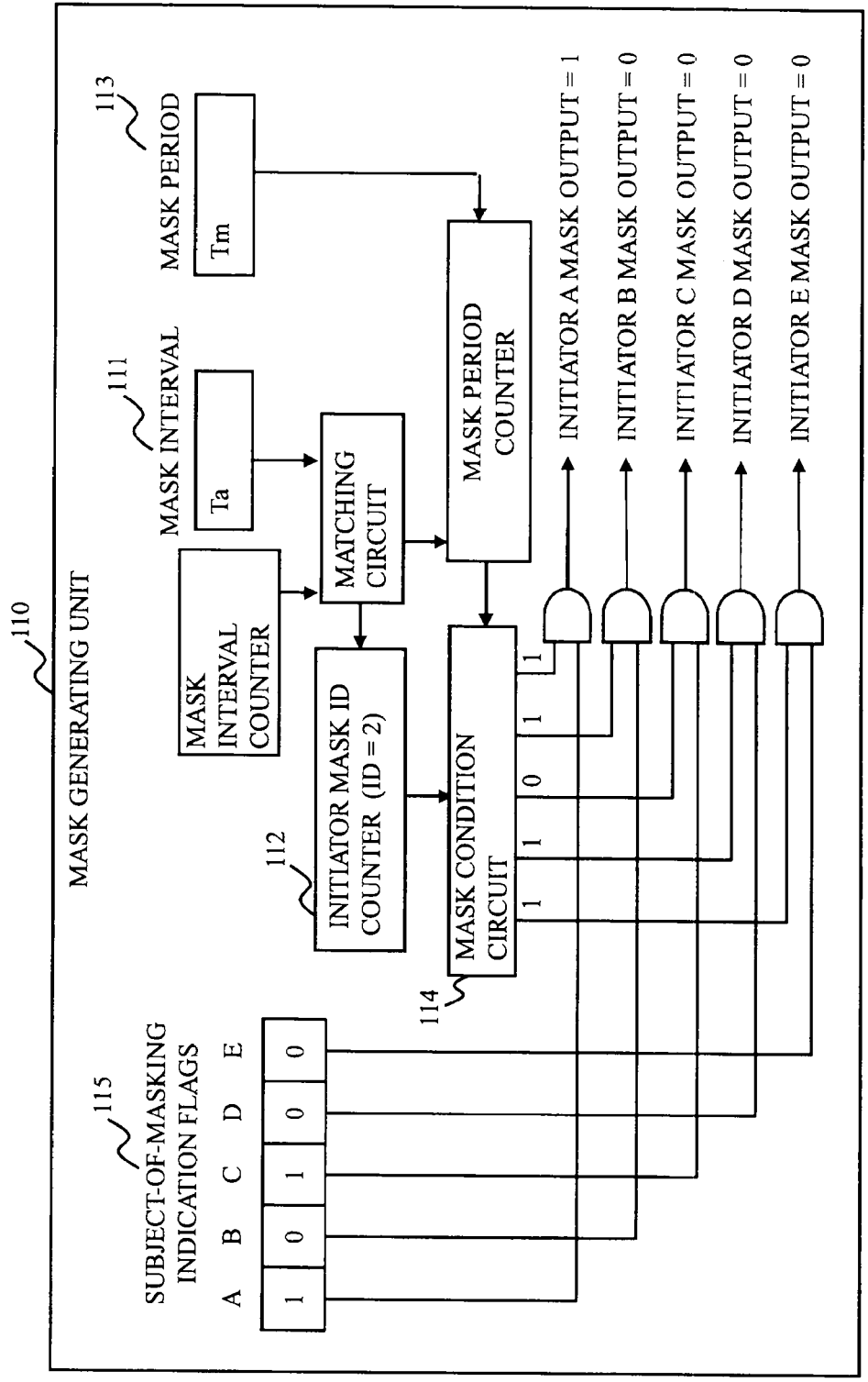
FIG. 3 is an operating principle diagram of a mask generating unit according to the first embodiment.
Figure 4:
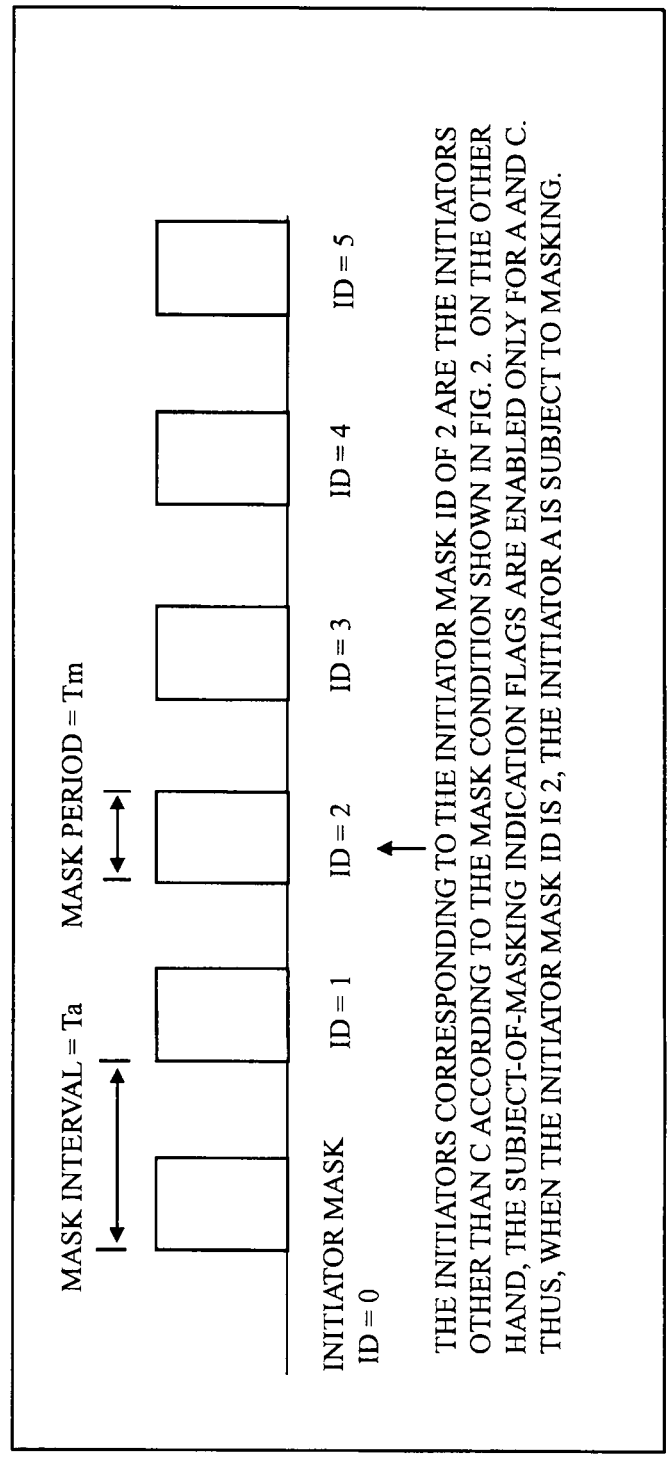
FIG. 4 is a diagram showing the relationship of a mask interval, a mask period, and an initiator mask ID counter according to the first embodiment.
Figure 5:
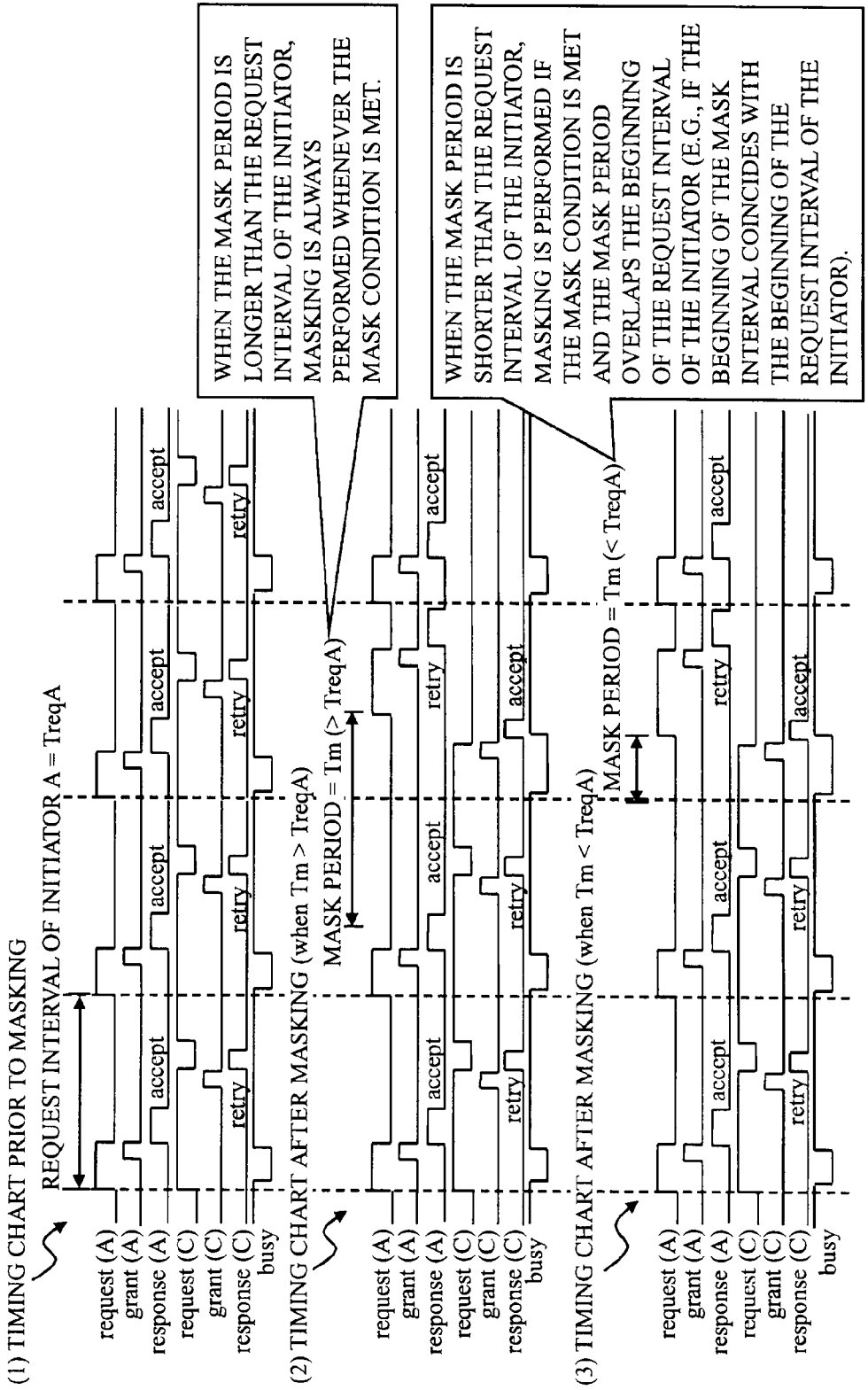
FIG. 5 is a timing chart associated with initiators indicated by subject-of-masking indication flags according to the first embodiment.
Figure 6:
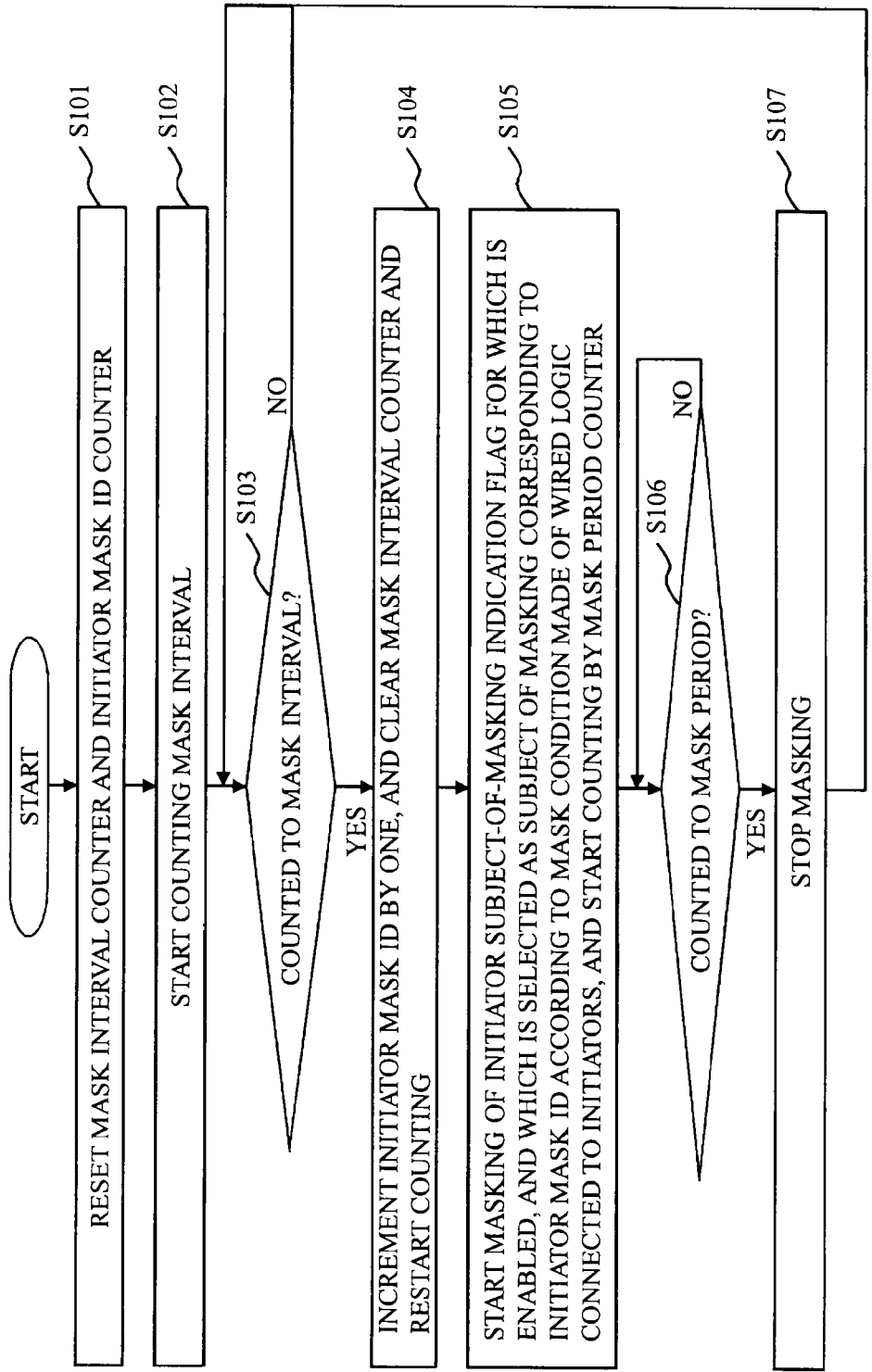
FIG. 6 is a flowchart showing operations of the mask generating unit according to the first embodiment.
Figure 8:
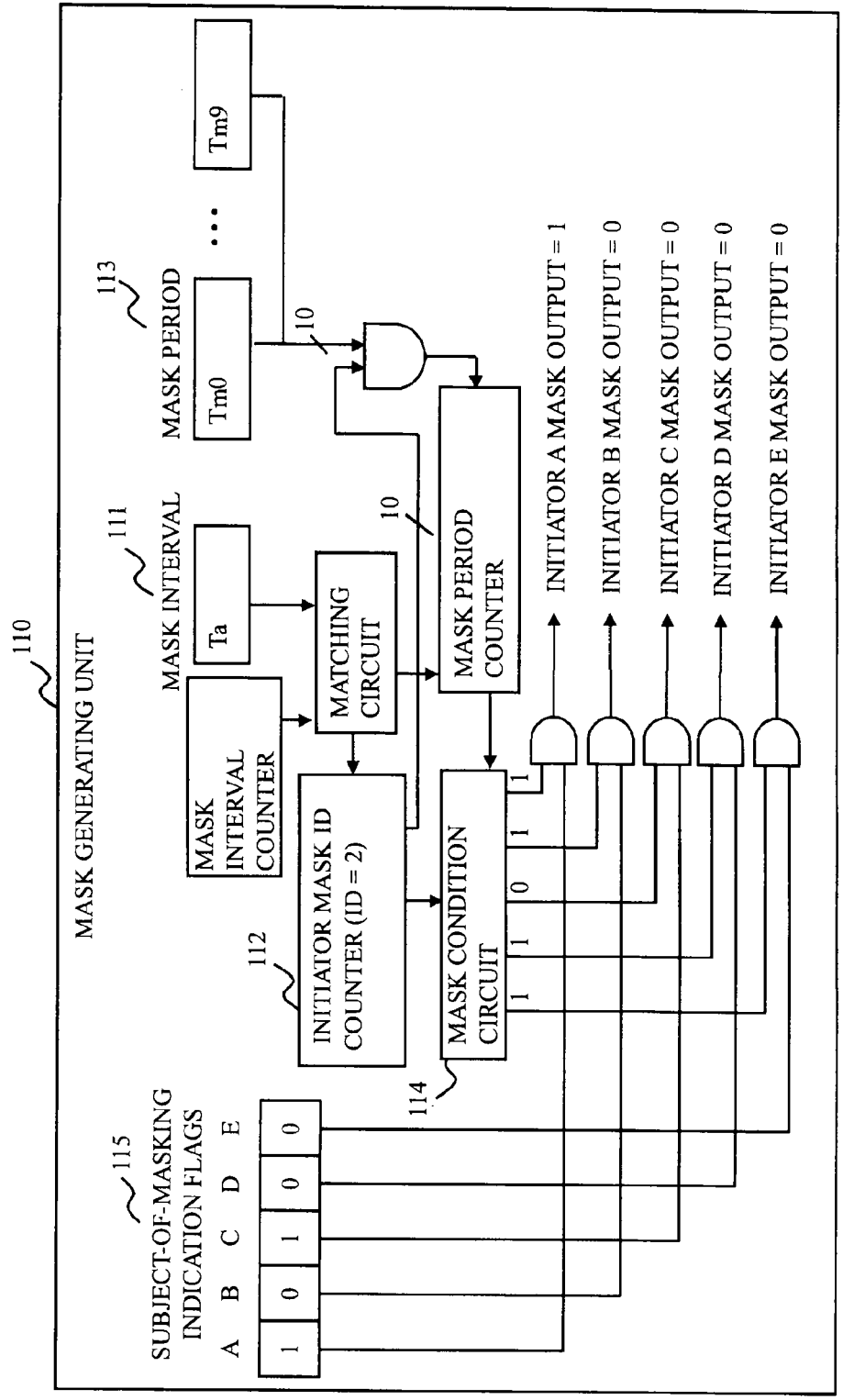
FIG. 8 is an operating principle diagram of the mask generating unit according to the third embodiment.
Figure 9:
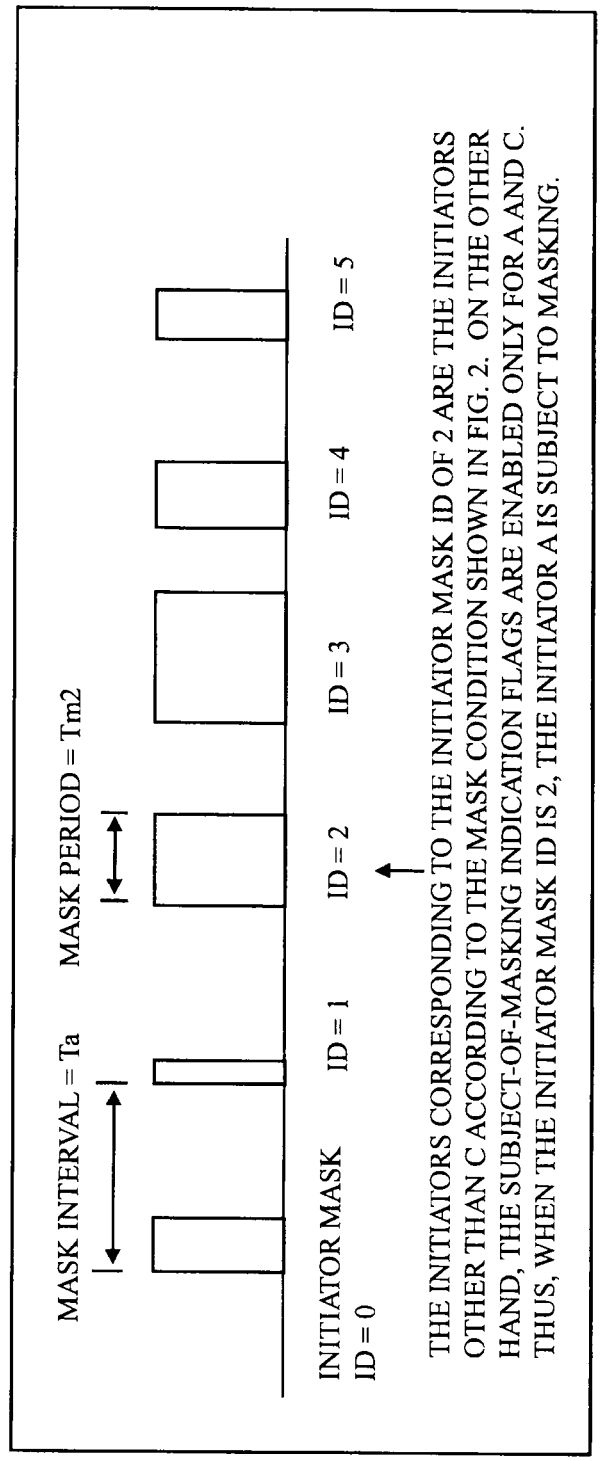
FIG. 9 is a diagram showing the relationship of the mask interval, the mask period, and the initiator mask ID counter according to the third embodiment.
Figure 10:
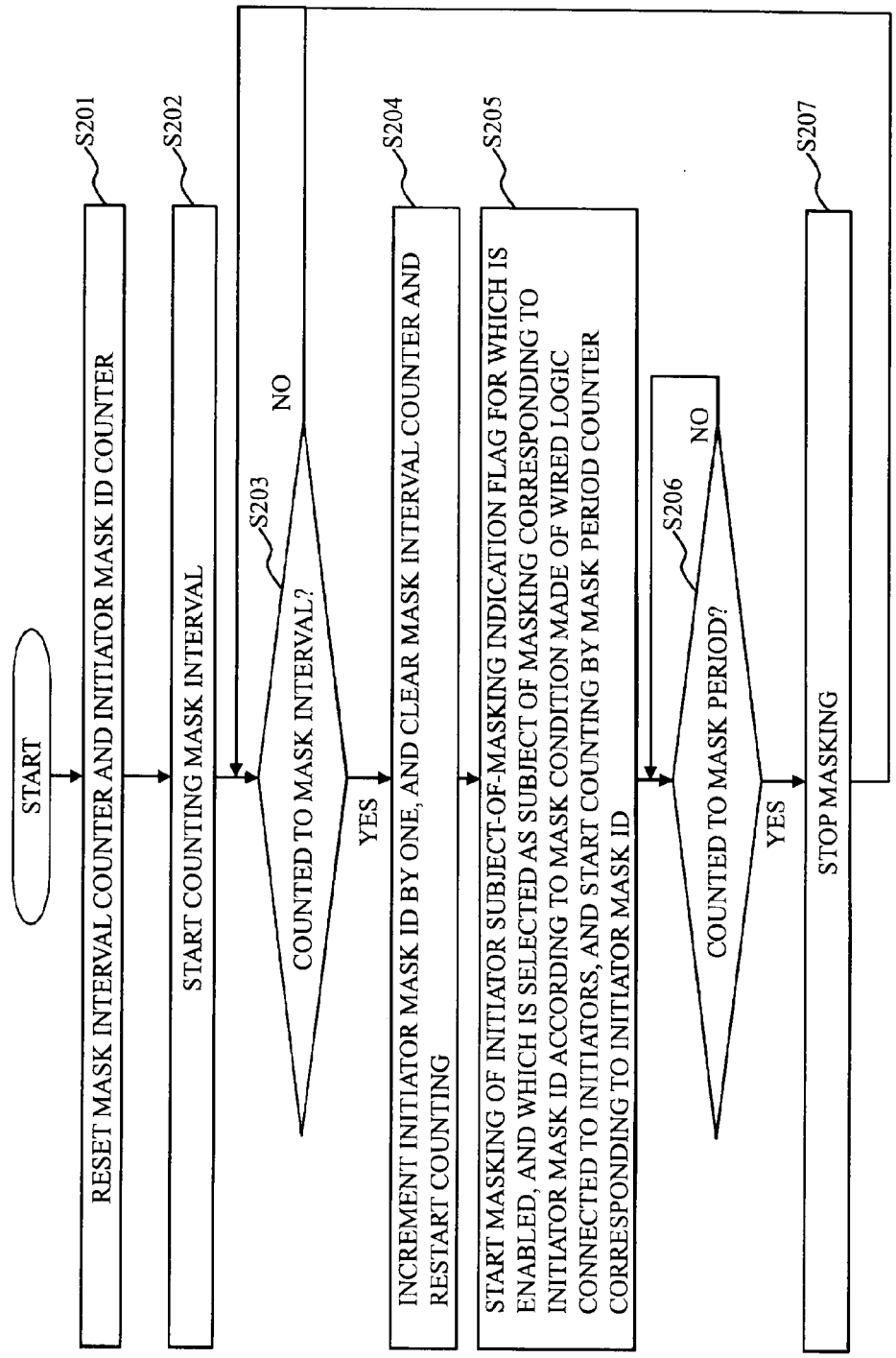
FIG. 10 is a flowchart showing operations of the mask generating unit according to the third embodiment.
Figure 11:
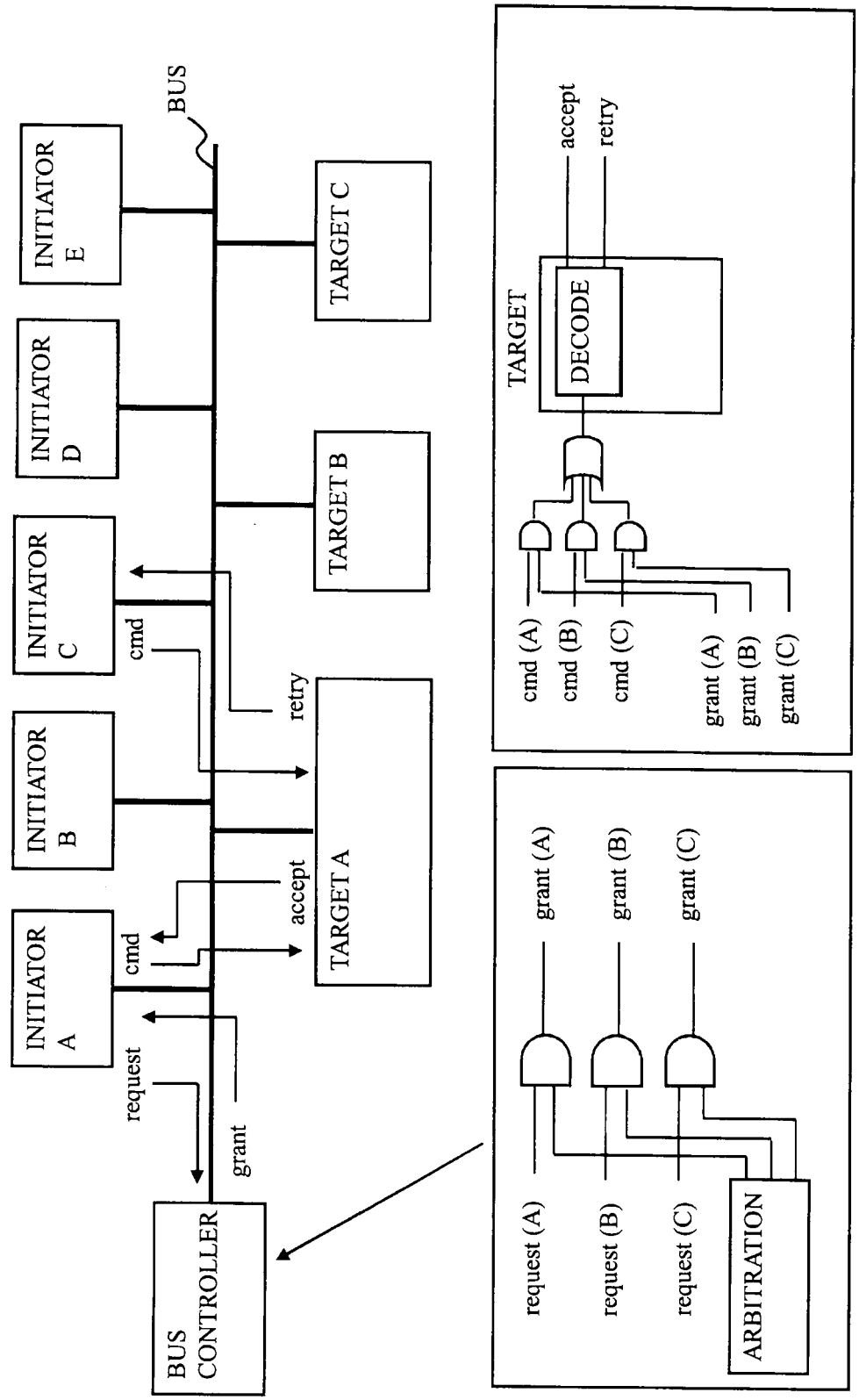
FIG. 11 is a block diagram showing a configuration of a commonly used data bus system.

100: bus communication system, 101: bus controller, 102: initiator, 103: target, 104: bus, 110: mask generating unit, 111: mask interval setting unit, 112: initiator mask ID counter, 113: mask period setting unit, 114: mask condition setting unit, 115: subject-of-masking indication flag setting unit, 120: bus control unit, 201: CPU, 202: memory

The invention claimed is:

1. A bus controller for controlling a bus communication system wherein each initiator of a plurality of initiators connected to a bus generates and sends a request signal to request use of the bus at predetermined intervals, and upon being granted use of the bus in response to the request signal, sends a command signal to instruct execution of a predetermined process to a target connected to the bus, and when the each initiator determines that the predetermined process is not to be executed by the target, the each initiator sends, upon being granted use of the bus again, the command signal to the target, the bus controller comprising:

a bus control unit configured to, upon receiving the request signal from the each initiator, grant use of the bus to the each initiator based on predetermined priorities; and a mask generating unit configured to mask the request signal generated by the each initiator to control a timing, at which the request signal is sent from the each initiator, to be aperiodic, wherein the mask generating unit includes a mask interval setting unit configured to set, as a mask interval, an interval for masking the request signal generated by the each initiator;

a mask condition setting unit configured to set, as a plurality of mask conditions, a plurality of combinations of initiators to be subject to masking, the plurality of mask conditions including as many excluding mask conditions as the plurality of initiators, each of the excluding mask conditions corresponding to each of the plurality of initiators and being a combination of initiators to be subject to masking from which only the each of the plurality of initiators corresponding to the each of the excluding mask conditions is excluded among the plurality of initiators; and a counter of an initiator mask ID (identifier) corresponding to each of the plurality of mask conditions set by the mask condition setting unit, and wherein the mask generating unit, at each mask interval set by the mask interval setting unit, counts up the counter, determines a selected initiator to be subject to masking among the plurality of initiators, the selected initiator having the initiator mask ID indicated by the counter, and masks a request signal generated by the selected initiator.

2. The bus controller of claim 1,
wherein the mask interval setting unit sets, as the mask interval, an interval different from an interval at which the each initiator generates and sends the request signal.

3. The bus controller of claim 2,
wherein the mask generating unit masks the request signal generated by the selected initiator for a period longer than an interval at which the selected initiator generates and sends the request signal.

4. The bus controller of claim 1,
wherein the plurality of mask conditions further includes a mask condition that is a combination of initiators to be subject to masking in which all of the plurality of initiators are included.

5. The bus controller of claim 1,
wherein the mask condition setting unit sets the plurality of mask conditions for each type of the command signal.

6. The bus controller of claim 1,
wherein the mask generating unit further includes a mask period setting unit configured to set, as a mask period, a period of time to perform masking during each mask interval set by the mask interval setting unit.

7. The bus controller of claim 1,
wherein the mask generating unit further includes a subject-of-masking indication flag setting unit configured to set whether or not the each initiator is subject to masking.

8. A bus communication system comprising a plurality of initiators and at least one target both connected to a bus, wherein each initiator generates and sends a request signal to request use of the bus at predetermined intervals, and upon being granted use of the bus in response to the request signal, sends a command signal to instruct execution of a predetermined process to a target, and when the each initiator determines that the predetermined process is not to be executed by the target, the each initiator sends, upon being granted use of the bus again, the command signal to the target, the bus communication system further comprising a bus controller connected to the bus, the bus controller including a bus control unit configured to, upon receiving the request signal from the each initiator, grant use of the bus to the each initiator based on predetermined priorities, and a mask generating unit configured to mask the request signal generated by the each initiator to control a timing, at which the request signal is sent from the each initiator, to be aperiodic, wherein the mask generating unit includes a mask interval setting unit configured to set, as a mask interval, an interval for masking the request signal generated by the each initiator;

a mask condition setting unit configured to set, as a plurality of mask conditions, a plurality of combinations of initiators to be subject to masking, the plurality of mask conditions including as many excluding mask conditions as the plurality of initiators, each of the excluding mask conditions corresponding to each of the plurality of initiators and being a combination of initiators to be subject to masking from which only the each of the plurality of initiators corresponding to the each of the excluding mask conditions is excluded among the plurality of initiators; and a counter of an initiator mask ID (identifier) corresponding to each of the plurality of mask conditions set by the mask condition setting unit, and wherein the mask generating unit, at each mask interval set by the mask interval setting unit, counts up the counter, determines a selected initiator to be subject to masking among the plurality of initiators, the selected initiator having the initiator mask ID indicated by the counter, and masks a request signal generated by the selected initiator.

9. A bus control method for controlling a bus communication system wherein each initiator of a plurality of initiators connected to a bus generates and sends a request signal to request use of the bus at predetermined intervals, and upon being granted use of the bus in response to the request signal, sends a command signal to instruct execution of a predetermined process to a target connected to the bus, and when the each initiator determines that the predetermined process is not to be executed by the target, the each initiator sends, upon being granted use of the bus again, the command signal to the target, the bus control method comprising:

granting use of the bus to the each initiator based on predetermined priorities upon receiving the request signal from the each initiator; and masking the request signal generated by the each initiator to control a timing, at which the request signal is sent from the each initiator, to be aperiodic, wherein the masking includes setting, as a mask interval, an interval for masking the request signal generated by the each initiator;

setting, as a plurality of mask conditions, a plurality of combinations of initiators to be subject to masking, the plurality of mask conditions including as many excluding mask conditions as the plurality of initiators, each of the excluding mask conditions corresponding to each of the plurality of initiators and being a combination of initiators to be subject to masking from which only the each of the plurality of initiators corresponding to the each of the excluding mask conditions is excluded among the plurality of initiators; and at each of the mask interval, counting up a counter of an initiator mask ID (identifier) corresponding to each of the plurality of mask conditions, determining a selected initiator to be subject to masking among the plurality of initiators, the selected initiator having the initiator mask ID indicated by the counter, and masking a request signal generated by the selected initiator.

* * * * *